United States Patent
Hasegawa et al.

(10) Patent No.: US 9,920,394 B2
(45) Date of Patent: Mar. 20, 2018

(54) BAKE-HARDENING GALVANIZED STEEL SHEET

(71) Applicant: JFE STEEL CORPORATION, Tokyo (JP)

(72) Inventors: Kohei Hasegawa, Tokyo (JP); Koichiro Fujita, Nagoya (JP); Yusuke Kimata, Fukuyama (JP); Kozo Harada, Jakarta (ID)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 15/100,436

(22) PCT Filed: Nov. 27, 2014

(86) PCT No.: PCT/JP2014/005944
§ 371 (c)(1),
(2) Date: May 31, 2016

(87) PCT Pub. No.: WO2015/079699
PCT Pub. Date: Jun. 4, 2015

(65) Prior Publication Data
US 2016/0298207 A1    Oct. 13, 2016

(30) Foreign Application Priority Data
Nov. 28, 2013  (JP) ................. 2013-246237

(51) Int. Cl.
*C22C 38/16* (2006.01)
*C22C 38/14* (2006.01)
*C22C 38/12* (2006.01)
*C22C 38/18* (2006.01)
*C22C 38/08* (2006.01)
*C22C 38/06* (2006.01)
*C22C 38/04* (2006.01)
*C22C 38/02* (2006.01)
*C22C 38/00* (2006.01)
*C23C 2/06* (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 1/74* (2013.01); *C21D 1/76* (2013.01); *C21D 8/0236* (2013.01); *C21D 8/0247* (2013.01); *C21D 8/0263* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C22C 38/54* (2013.01); *C23C 2/06* (2013.01); *C23C 2/40* (2013.01); *C23C 30/00* (2013.01); *C23C 30/005* (2013.01); *C23F 17/00* (2013.01); *C21D 1/673* (2013.01); *C21D 2211/003* (2013.01); *C21D 2211/005* (2013.01); *Y10T 428/12799* (2015.01); *Y10T 428/12951* (2015.01); *Y10T 428/12972* (2015.01); *Y10T 428/263* (2015.01); *Y10T 428/264* (2015.01); *Y10T 428/265* (2015.01); *Y10T 428/273* (2015.01)

(58) Field of Classification Search
CPC .......... C23C 2/40; C23C 2/06; C23C 30/005; C23C 28/021; C23C 28/025; C23C 30/00; C22C 38/00; C22C 38/06; C22C 38/54; C22C 38/002; C22C 38/001; C22C 38/18; C22C 38/12; C22C 38/16; C22C 38/08; C22C 38/04; C22C 38/02; C22C 38/14; C22C 38/20; C22C 38/24; C22C 38/26; C22C 38/28; C22C 38/32; C22C 38/40; C22C 38/42; C22C 38/46; C22C 38/48; C22C 38/50; B32B 15/013; B32B 15/04; B32B 15/043; B32B 15/18; Y10T 428/12951; Y10T 428/12972; Y10T 428/12799; Y10T 428/263; Y10T 428/264; Y10T 428/265; Y10T 428/273
See application file for complete search history.

(56) References Cited

U.S. PATENT DOCUMENTS

2014/0044989 A1    2/2014    Toda et al.

FOREIGN PATENT DOCUMENTS

CA    2832176 A1    10/2012
CN    102791400 A    11/2012
(Continued)

OTHER PUBLICATIONS

Machine Translation, Tatsuo, et al., JP 2012-012658, Jan. 2012.*
(Continued)

*Primary Examiner* — Michael E. La Villa
(74) *Attorney, Agent, or Firm* — Oliff PLC

(57) ABSTRACT

A bake-hardening galvanized steel sheet having a base steel sheet and a coating layer formed on the base steel sheet, the base steel sheet having a specified chemical composition and a metallographic structure including a ferrite phase and a cementite phase, in which an average ferrite grain diameter is controlled to be 10 μm or more and 30 μm or less, and in which the surface area of the interface between ferrite and cementite per unit volume is controlled to be 1.0/mm or more and 10.0/mm or less, a hydrogen concentration in steel of the base steel sheet is controlled to be less than 0.1 ppm, and a zinc coating weight per unit surface area of the steel sheet is controlled to be 40 g/m² or more and 100 g/m² or less.

4 Claims, No Drawings

(51) Int. Cl.
- *C23C 2/40* (2006.01)
- *C23F 17/00* (2006.01)
- *C21D 9/46* (2006.01)
- *C21D 8/02* (2006.01)
- *C21D 1/76* (2006.01)
- *B32B 15/18* (2006.01)
- *B32B 15/04* (2006.01)
- *B32B 15/01* (2006.01)
- *C23C 30/00* (2006.01)
- *C21D 1/74* (2006.01)
- *C22C 38/54* (2006.01)
- *C21D 1/673* (2006.01)

(56) References Cited

FOREIGN PATENT DOCUMENTS

| | | |
|---|---|---|
| CN | 102947476 A | 2/2013 |
| CN | 103492599 A | 1/2014 |
| EP | 2 546 008 A1 | 1/2013 |
| EP | 2700728 A1 | 2/2014 |
| EP | 2740813 A1 | 6/2014 |
| JP | 56-119736 A | 9/1981 |
| JP | 58-019442 | 2/1983 |
| JP | 58-031035 | 2/1983 |
| JP | 02-125817 | 5/1990 |
| JP | 05-59445 A | 3/1993 |
| JP | 06-73498 A | 3/1994 |
| JP | H10-219350 A | 8/1998 |
| JP | H10-219351 A | 8/1998 |
| JP | 2002-167646 A | 6/2002 |
| JP | 2008-163388 A | 7/2008 |
| JP | 2008-266673 A | 11/2008 |
| JP | 2010255111 A | 11/2010 |
| JP | 2012-012658 * | 1/2012 |
| JP | 2012012658 A | 1/2012 |
| KR | 2013-0135348 A | 12/2013 |
| MX | 2013012116 A | 12/2013 |
| TW | 201247897 A | 12/2012 |
| WO | 2012/144567 A1 | 10/2012 |
| WO | 2013022010 A1 | 2/2013 |

OTHER PUBLICATIONS

Feb. 24, 2015 International Search Report issued in International Patent Application No. PCT/JP2014/005944.

Aug. 14, 2017 Office Action issued in Chinese Patent Application No. 201480064901.5.

Dec. 15, 2016 Search Report issued in European Patent Application No. 14865649.9.

Jan. 11, 2017 Office Action issued in Chinese Patent Application No. 201480064901.5.

Feb. 21, 2017 Office Action issued in Korean Patent Application No. 2016-7013833.

\* cited by examiner

BAKE-HARDENING GALVANIZED STEEL SHEET

TECHNICAL FIELD

The present invention relates to a bake-hardening galvanized steel sheet which is optimum for manufacturing automotive outer panels, structural skeleton members, and any other kinds of machine structural parts.

BACKGROUND ART

Automotive outer panels are required to have shape fixability when press forming is performed and depression resistance after press forming has been performed. Therefore, a material which is used for manufacturing automotive outer panels is required to have a low yield strength when subjected to forming and a hardenability when subjected to paint baking, that is, a so-called paint-bake hardenability. Patent Literature 1 through Patent Literature 3 disclose methods for manufacturing bake-hardening steel sheets which can be manufactured by using a continuous annealing furnace.

In addition, a bake-hardening steel sheet is required to have press workability. Patent Literature 4 discloses a method for improving such properties by controlling the volume ratio of carbides in grains with respect to the total carbon precipitated during continuous annealing and an over-ageing treatment to be 80% or more.

In addition, Patent Literature 5 discloses a method for achieving a paint-bake hardenability at a low temperature of 150° C. or lower by controlling the number density of carbides in grains to be $4 \times 10^4$ pieces/mm$^2$ or more.

Moreover, a steel sheet for automotive outer panels is required to have excellent corrosion resistance. Patent Literature 6 discloses a method for manufacturing a galvanized steel sheet which is subjected to a galvanizing treatment in order to increase corrosion resistance.

Regarding a galvanizing technique, in the case of a galvanized steel sheet having a coating weight of 40 g/m$^2$ or more, hydrogen which penetrates into a steel sheet from a hydrogen-containing reducing atmospheric gas during continuous annealing is enclosed behind the coating layer. Subsequently, after the steel sheet has been cooled to room temperature, over-saturated hydrogen is gasified at the interface between the surface of the steel sheet and the coating layer, which causes a problem of a blister defect in which the coating layer becomes swollen. The blister defect tends to become more evident in the case where the coating weight is large and where an alloying treatment is not performed. As an example of a method for preventing such a blister defect, Patent Literature 7 discloses a method for controlling the size and amount of Ti-based precipitates in ultralow-carbon steel having a C content of less than 0.005%.

CITATION LIST

Patent Literature

PTL 1: Japanese Unexamined Patent Application Publication No. 56-119736
PTL 2: Japanese Unexamined Patent Application Publication No. 58-019442
PTL 3: Japanese Unexamined Patent Application Publication No. 2-125817
PTL 4: Japanese Unexamined Patent Application Publication No. 5-059445
PTL 5: Japanese Unexamined Patent Application Publication No. 6-073498
PTL 6: Japanese Unexamined Patent Application Publication No. 58-031035
PTL 7: Japanese Unexamined Patent Application Publication No. 2002-167646

SUMMARY OF INVENTION

Technical Problem

An object of the present invention is to provide a bake-hardening galvanized steel sheet which can preferably be used for, for example, automotive outer panels, which has bake hardenability and corrosion resistance, which has good press formability, and with which a blister defect does not occur when a galvanizing treatment is performed, despite being manufactured at low cost by using low-carbon steel which can be comparatively easily manufactured.

Solution to Problem

The present inventors diligently conducted investigations in order to solve the problems described above. In the process of the investigations, the present inventors thought that it is possible to inhibit blistering from occurring by trapping hydrogen, which causes blistering, inside a steel sheet in order to prevent hydrogen from diffusing into the surface layer of the steel sheet. However, when Ti was used in order to utilize Ti-based precipitates disclosed in Patent Literature 7, in the case of low-carbon steel, there was an increase in strength due to the formation of a large amount of TiC grains having a small diameter, and therefore it was not possible to achieve satisfactory formability which is required for outer panels. On the other hand, in the case of low-carbon steel, since it is possible to form cementite in ferrite as is disclosed in Patent Literature 4 and Patent Literature 5, the hydrogen trapping effect of cementite was expected to be realized. However, it was not possible to inhibit blistering only by controlling the locations and number density of cementite.

Therefore, the present inventors diligently conducted additional investigations, and, as a result, found that the surface area of the interface between ferrite and cementite has the largest influence on the hydrogen trapping capability. In addition, it was clarified that, by taking the chemical composition of a base steel sheet, metallographic structure, hydrogen concentration in steel, and the coating weight of a coating layer into account when controlling the surface area described above, it is possible to inhibit blistering from occurring and to achieve optimum formability for automotive outer panels.

The present invention has been complete on the basis of the knowledge described above, and provides the following matters.

(1) A bake-hardening galvanized steel sheet having a base steel sheet and a coating layer formed on the base steel sheet, the base steel sheet containing, by mass %, C: 0.015% or more and 0.100% or less, Si: 0.01% or more and 0.30% or less, Mn: 0.1% or more and 1.0% or less, P: 0.010% or more and 0.070% or less, S: 0.003% or more and 0.020% or less, Sol.Al: 0.01% or more and 0.10% or less, N: 0.002% or more and 0.005% or less, and the balance being Fe and inevitable impurities, in which a metallographic structure of the base steel sheet includes a ferrite phase and a cementite phase, an average ferrite grain diameter being 10 μm or more and 30 μm or less and a surface area of the interface between ferrite and cementite per unit volume being 1.0/mm or more and 10.0/mm or less, a hydrogen concentration in steel of the base steel sheet is less than 0.1 ppm, and the coating layer has a zinc coating weight per unit surface area of the steel sheet of 40 g/m² or more and 100 g/m² or less.

(2) The bake-hardening galvanized steel sheet according to item (1), in which the base steel sheet further contains, by mass %, B: 0.0010% or more and 0.0050% or less.

(3) The bake-hardening galvanized steel sheet according to item (1) or (2), in which the base steel sheet further contains, by mass %, at least one selected from among Ti: 0.001% or more and 0.1% or less, Nb: 0.001% or more and 0.1% or less, Zr: 0.001% or more and 0.1% or less, Cr: 0.001% or more and 0.1% or less, Cu: 0.001% or more and 0.1% or less, Ni: 0.001% or more and 0.1% or less, and V: 0.001% or more and 0.1% or less.

Advantageous Effects of Invention

According to the present invention, it is possible to provide a bake-hardening galvanized steel sheet which can preferably be used for, for example, automotive outer panels, which has bake hardenability, corrosion resistance, good press formability, and with which a blister defect does not occur when a galvanizing treatment is performed, despite being manufactured at low cost. That is, the present invention can contribute to an increase in occupant safety and to the global environment conservation through the strengthening and weight reduction of automobiles.

DESCRIPTION OF EMBODIMENTS

Hereafter, the embodiments of the present invention will be described. Here, the present invention is not limited to the embodiments below. In addition, in the following description, when describing the contents of the constituent chemical elements, "%" refers to "mass %" and "ppm" refers to "mass ppm".

The bake-hardening galvanized steel sheet according to the present invention has a base steel sheet and a coating layer formed on the base steel sheet.

Base Steel Sheet

The base steel sheet according to the present invention contains, by mass %, C: 0.015% or more and 0.100% or less, Si: 0.01% or more and 0.30% or less, Mn: 0.1% or more and 1.0% or less, P: 0.010% or more and 0.070% or less, S: 0.003% or more and 0.020% or less, Sol.Al: 0.01% or more and 0.10% or less, N: 0.002% or more and 0.005% or less, and the balance being Fe and inevitable impurities. In addition, the base steel sheet according to the present invention may further contain, by mass %, B: 0.0010% or more and 0.0050% or less. In addition, the base steel sheet according to the present invention may further contain, by mass %, at least one selected from among Ti: 0.001% or more and 0.1% or less, Nb: 0.001% or more and 0.1% or less, Zr: 0.001% or more and 0.1% or less, Cr: 0.001% or more and 0.1% or less, Cu: 0.001% or more and 0.1% or less, Ni: 0.001% or more and 0.1% or less, and V: 0.001% or more and 0.1% or less. First, the reasons for limitations on the chemical composition of the base steel sheet will be described.

C: 0.015% or More and 0.100% or Less

C is effective for strengthening a steel sheet and for inhibiting blistering of a coating layer by trapping hydrogen as a result of forming cementite. In the case where the C content is less than 0.015%, there is an insufficient effect of inhibiting blistering. In addition, in the case where the C content is more than 0.100%, there is a decrease in workability due to an excessive increase in strength. Therefore, the C content is set to be 0.015% or more and 0.100% or less. In addition, since it is possible to control the strength of a bake-hardening galvanized steel sheet in accordance with the C content, the C content may be decided in accordance with desired strength within the range described above.

Si: 0.01% or More and 0.30% or Less

There is a significant increase in desiliconization costs in order to control the Si content of the base steel sheet to be less than 0.01%. In the case where the Si content is more than 0.30%, since Si oxides are formed when heating and holding processes are performed for an annealing treatment following cold rolling, there is a decrease in the adhesiveness of a galvanizing layer. Therefore, it is necessary that the Si content be 0.01% or more and 0.30% or less.

Mn: 0.1% or More and 1.0% or Less

Mn is a chemical element which not only increases the workability of a steel sheet by rendering S harmless as a result of forming MnS but also contributes to an increase in the strength of a steel sheet. In the case where the Mn content is less than 0.1%, there is an insufficient effect of forming MnS. In addition, in the case where the Mn content is more than 1.0%, there is a decrease in workability due to an excessive increase in strength. Therefore, it is necessary that the Mn content be 0.1% or more and 1.0% or less. In addition, since it is possible to control the strength of a bake-hardening galvanized steel sheet in accordance with the Mn content, the Mn content may be decided in accordance with desired strength within the range described above.

P: 0.010% or More and 0.070% or Less

There is a significant increase in dephosphorization costs in order to control the P content of the base steel sheet to be less than 0.010%. In the case where the P content is more than 0.070%, there is a decrease in workability due to an excessive increase in strength. Therefore, it is necessary that the P content be 0.010% or more and 0.070% or less.

S: 0.003% or More and 0.020% or Less

In the case of the base steel sheet in the present invention, a S content of more than 0.020% causes a decrease in formability and surface defects. On the other hand, there is a significant increase in desulfurization costs in order to control the S content to be less than 0.003%. Therefore, it is necessary that the S content be 0.003% or more and 0.020% or less.

Sol.Al: 0.01% or More and 0.10% or Less

Al is used for deoxidation. In the case where the Sol.Al content is less than 0.01%, such an effect is insufficiently realized and there is an increase in the risk of surface defects occurring. On the other hand, in the case where the Sol.Al content is more than 0.10%, since the deoxidizing effect becomes saturated, there is an economic disadvantage. Therefore, the Sol.Al content is set to be 0.01% or more and 0.10% or less.

N: 0.002% or More and 0.005% or Less

The base steel sheet in the present invention contains N as an impurity in many cases. A N content of more than 0.005% causes a decrease in formability and surface defects. On the other hand, there is a significant increase in denitrification costs in order to control the N content to be less than 0.002%. Therefore, it is necessary that the N content be 0.002% or more and 0.005% or less.

The Balance Being Fe and Inevitable Impurities

The essential constituent chemical elements of the base steel sheet in the present invention are as described above, and the remaining constituent chemical elements are Fe and inevitable impurity elements which are mixed in from iron raw materials or in the manufacturing processes.

In addition, the base steel sheet in the present invention may further contain a small amount of other chemical elements within ranges in which the effects of the chemical elements described above are not decreased. Examples of the chemical elements which do not decrease the effects of the present invention or which are inevitable impurity elements include Mo, Cr, Ti, Nb, V, Cu, Ni, B, Ca, and Zr. These chemical elements have effects of, for example, increasing strength. However, there is a decrease in ductility or surface quality in the case where the contents of these chemical elements are excessively large. Therefore, the contents of these optional constituent chemical elements, that is, Mo, Cr, Ti, Nb, V, Cu, Ni, Ca, and Zr should be respectively limited to 0.5% or less, 1.0% or less, 0.2% or less, 0.1% or less, 0.1% or less, 1.0% or less, 1.0% or less, 0.005% or less, and 0.1% or less.

Among the optional chemical elements described above, in the present invention, it is preferable that the base steel sheet contain B: 0.0010% or more and 0.0050% or less.

B: 0.0010% or More and 0.0050% or Less

Since B is effective for rendering N harmless by combining with a solid solute N to form coarse BN grains, B is added as needed. In the case where the B content is less than 0.0010%, such an effect is insufficiently realized. In the case where the B content is more than 0.0050%, there is an excessive increase in ageing capability and stretcher strain tends to occur. In the case where B is added, it is preferable that the B content be 0.0010% or more and 0.0050% or less.

In addition, among the optional constituent chemical elements described above, in the present invention, it is preferable that the base steel sheet contain at least one selected from among Ti: 0.001% or more and 0.1% or less, Nb: 0.001% or more and 0.1% or less, Zr: 0.001% or more and 0.1% or less, Cr: 0.001% or more and 0.1% or less, Cu: 0.001% or more and 0.1% or less, Ni: 0.001% or more and 0.1% or less, and V: 0.001% or more and 0.1% or less.

Ti: 0.001% or More and 0.1% or Less

In the case where the base steel sheet contains Ti, Ti combines with a solid solute N to form TiN. In such manner, Ti is effective for rendering N harmless. In the case where the Ti content is less than 0.001%, such an effect is insufficiently realized. In the case where the Ti content is more than 0.1%, since an excessive amount of TiC forms, there may be a decrease in elongation. Therefore, in the case where Ti is added, it is preferable that the Ti content be 0.001% or more and 0.1% or less.

Nb: 0.001% or More and 0.1% or Less

In the case where the base steel sheet contains Nb, a precipitation strengthening effect is realized as a result of the precipitation of NbC. In the case where the Nb content is less than 0.001%, such an effect is insufficiently realized. In the case where the Nb content is more than 0.1%, since an excessive amount of NbC forms, there may be a decrease in elongation. Therefore, in the case where Nb is added, it is preferable that the Nb content be 0.001% or more and 0.1% or less.

Zr: 0.001% or More and 0.1% or Less

In the case where Zr is added, a precipitation strengthening effect is realized as a result of the precipitation of ZrC. In the case where the Zr content is less than 0.001%, such an effect is insufficiently realized. In the case where the Zr content is more than 0.1%, since an excessive amount of ZrC forms, there may be a decrease in elongation. Therefore, in the case where Zr is added, it is preferable that the Zr content be 0.001% or more and 0.1% or less.

Cr: 0.001% or More and 0.1% or Less

In the case where Cr is added, a solid solution strengthening effect is realized. In the case where the Cr content is less than 0.001%, such an effect is insufficiently realized. In the case where the Cr content is more than 0.1%, there may be a decrease in elongation. Therefore, in the case where Cr is added, it is preferable that the Cr content be 0.001% or more and 0.1% or less.

Cu: 0.001% or More and 0.1% or Less

In the case where Cu is added, a solid solution strengthening effect is realized. In the case where the Cu content is less than 0.001%, such an effect is insufficiently realized. In the case where the Cu content is more than 0.1%, there may be a decrease in elongation. Therefore, in the case where Cu is added, it is preferable that the Cu content be 0.001% or more and 0.1% or less.

Ni: 0.001% or More and 0.1% or Less

In the case where Ni is added, a solid solution strengthening effect is realized. In the case where the Ni content is less than 0.001%, such an effect is insufficiently realized. In the case where the Ni content is more than 0.1%, there may be a decrease in elongation. Therefore, in the case where Ni is added, it is preferable that the Ni content be 0.001% or more and 0.1% or less.

V: 0.001% or More and 0.1% or Less

In the case where V is added, a precipitation strengthening effect is realized as a result of the precipitation of VC. In the case where the V content is less than 0.001%, such an effect is insufficiently realized. In the case where the V content is more than 0.1%, since an excessive amount of VC forms, there may be a decrease in elongation. Therefore, in the case where V is added, it is preferable that the V content be 0.001% or more and 0.1% or less.

Hereafter, the metallographic structure of the base steel sheet will be described. The metallographic structure according to the present invention includes a ferrite phase and a cementite phase, in which an average ferrite grain diameter is 10 µm or more and 30 µm or less, and in which the surface area of the interface between ferrite and cementite per unit volume is 1.0/mm or more and 10.0/mm or less ($mm^2/mm^3$)

Ferrite Phase and Cementite Phase

A ferrite phase is effective for increasing strength and workability, and a cementite phase is effective for inhibiting blistering from occurring through hydrogen trapping. A pearlite phase, which is an alternating-layer microstructure of a ferrite phase and a cementite phase, includes a ferrite phase and a cementite phase. In addition, it is preferable to prevent low-temperature-transformation phases such as bainite and martensite from being formed as much as possible from the viewpoint of workability. In the case where the content of each of the low-temperature-transformation phases is 5 vol. % or less, since there is little effect of these phases, these phases may be included. In addition, the carbides, nitrides, and sulfides of the constituent metal chemical elements may respectively be contained in accordance with the contents of the chemical elements. Here, it is possible to confirm that a metallographic structure includes a ferrite phase and a cementite phase by using the method described in the EXAMPLES.

Average ferrite grain diameter: 10 µm or more and 30 µm or less

In the case where the average ferrite grain diameter is less than 10 µm, there is a decrease in workability. In addition, in the case where the average ferrite grain diameter is more than 30 μm, since the grains tend to deform when, for example, press working is performed, unevenness tends to occur on the surface of a steel sheet due to the difference in the amount of deformation among the grains, which results in a decrease in the aesthetic appearance of the formed product. Therefore, it is necessary that the average ferrite grain diameter be 10 μm or more and 30 μm or less. Here, "average ferrite grain diameter" refers to the average ferrite grain diameter obtained by using the determining method described in the EXAMPLES.

Surface area of interface between ferrite and cementite per unit volume: 1.0/mm or more and 10.0/mm or less By controlling the surface area of the interface between ferrite and cementite per unit volume to be 1.0/mm or more and 10.0/mm or less, it is possible to inhibit blistering of a galvanizing layer from occurring. Such an effect is insufficiently realized in the case where the surface area is less than 1.0/mm, and there is a decrease in workability due to a decrease in the local ductility of a steel sheet in the case where the surface area is more than 10.0/mm.

Here, there are various methods for determining the surface area of the interface between ferrite and cementite. In the present invention, the value obtained by using the following method is used. By polishing and etching a cross section of a steel sheet, by identifying and separating a ferrite phase and a cementite phase by using a scanning electron microscope (SEM), and by determining the above-described surface area by using a line segment method (refer to, for example, Bulletin of the Japan Institute of Metals, Vol. 10 (1971), p. 279, Commentary Article "Quantitative Metallography"). For the measurement in the above-described determination, commercially available image analysis software (for example, "Particle Analysis" produced by Sumitomo Metal Technology, Ltd.) may be used.

Hydrogen Concentration in Steel: Less than 0.1 ppm

Hydrogen penetrates into a steel sheet from an atmospheric gas in a heat treatment process following cold rolling, and the hydrogen is then enclosed in the steel sheet when galvanizing treatment is performed, which results in blistering occurring after a galvanizing treatment has been performed. Therefore, it is necessary that the hydrogen concentration in a steel sheet be determined after a galvanizing treatment has been performed. In the case where the determined value is 0.1 ppm or more, it is difficult to inhibit blistering from occurring even though the metallographic structure is appropriately controlled. Therefore, the hydrogen concentration in steel should be less than 0.1 ppm.

Here, the hydrogen concentration in steel after a galvanizing treatment has been performed is determined by using an inert gas fusion-thermal conductivity method without removing a coating layer. In the case where a coating layer is removed by performing pickling, hydrogen penetrates into steel at that time, and in the case where a coating layer is removed by using a mechanical method, there is a decrease in hydrogen concentration due to the desorption of hydrogen, and therefore it is necessary to perform analysis without removing a coating layer. Here, a temperature increasing analysis method is not suitable because a zinc coating layer inhibits hydrogen desorption.

Coating Layer

The meaning of "coating layer" includes, in addition to a zinc coating layer containing mainly Zn, an alloyed-zinc coating layer containing mainly Fe—Zn alloy formed by an alloying reaction in which Fe in steel diffuses in a zinc coating layer.

The coating layer may contain Fe, Al, Sb, Pb, Bi, Mg, Ca, Be, Ti, Cu, Ni, Co, Cr, Mn, P, B, Sn, Zr, Hf, Sr, V, Se, and REM, in addition to Zn, within a range in which the effect of the present invention is not decreased.

Zinc coating weight of a coating layer: 40 g/m$^2$ or more and 100 g/m$^2$ or less per unit surface area of a steel sheet The zinc coating weight of a coating layer is 40 g/m$^2$ or more and 100 g/m$^2$ or less per unit surface area of a steel sheet. In the case where the zinc coating weight is within the range described above, it is possible to provide corrosion resistance, workability, and blister resistance which are required for steel sheet to be subjected to working for use in application including automotive outer panels. More specifically, in the case where the zinc coating weight is less than 40 g/m$^2$, it is not possible to achieve sufficient corrosion resistance. In addition, in the case where the zinc coating weight is more than 100 g/m$^2$, there is a decrease in workability due to an increase in the friction coefficient of the surface of the coated steel sheet, and, in addition, blistering tends to occur due to an increase in the effect of hydrogen enclosure in a steel sheet by the coating layer. Therefore, it is necessary that the zinc coating weight of a coating layer be 40 g/m$^2$ or more and 100 g/m$^2$ or less per unit surface area of a steel sheet.

Method for Manufacturing Bake-Hardening Galvanized Steel Sheet

A preferable method and conditions for manufacturing the bake-hardening galvanized steel sheet according to the present invention will be described.

A steel slab is manufactured so that the chemical composition of the base steel sheet described above is within the range described above. There is no particular limitation on what method is used for manufacturing a steel slab, and examples of the method include one in which steel is manufactured by using a known manufacturing method such as one using a converter or an electric furnace, and then a steel slab (steel material) is manufactured by using a continuous casting method.

The steel slab in the cast state may directly be subjected to hot rolling, or the steel slab may be subjected to hot rolling after being cooled to a temperature and then reheated by using, for example, a heating furnace. In the case where reheating is performed, it is preferable that the reheating temperature be 1150° C. or higher and 1300° C. or lower. In the case where the reheating temperature is lower than 1150° C., since there is an increase in resistance to deformation, it may be difficult to perform rolling to a desired thickness. On the other hand, in the case where the reheating temperature is higher than 1300° C., since the surface oxidation of the slab becomes marked, there is a decrease in the aesthetic appearance of a product in many cases.

In a hot rolling process, in order to control the surface area of the interface between ferrite and cementite to be within the desired range, it is preferable that cooling be performed at an average cooling rate of 100° C./sec. or more down to a temperature of 600° C. and that coiling be performed at a coiling temperature of 500° C. or lower, or more preferably 350° C. or lower, after rough rolling and finish rolling have been performed by using ordinary methods.

Cold rolling is performed after hot rolling has been performed, and then a heat treatment is performed after cold rolling has been performed. At this time, in order to control the surface area of the interface between ferrite and cementite to be within the desired range, it is preferable that heating be performed at an average heating rate of 100° C./sec. or more up to a temperature of 600° C. or higher. After heating has been performed as described above, heating is further performed to a temperature of 800° C. or higher and 870° C. or lower as needed. It is preferable that the temperature be held at the heating temperature for 10 seconds or more and then cooling is performed at an average cooling rate of 10° C./sec. or more and 30° C./sec. or less in a temperature range of 600° C. or higher and 700° C. or lower. The reasons why such conditions are preferable will be described hereafter.

In the case where the heating temperature is lower than 800° C., it is not possible to achieve a high elongation. On the other hand, in the case where the heating temperature is higher than 870° C., since hydrogen penetration into a steel sheet becomes marked, there is an increase in the amount of blistering occurring after a galvanizing treatment has been performed.

In the case where the holding time is less than 10 seconds, it is not possible to achieve a high elongation. Although there is no particular upper limit on the holding time, it is preferable that the holding time be 10 minutes or less from the viewpoint of productivity.

In the case where the average cooling rate is less than 10° C./sec., since a long cooling time is needed, there is a decrease in productivity. On the other hand, in the case where the average cooling rate is more than 30° C./sec., since a solid solute C is retained in steel in the oversaturated state, there is a decrease in elongation.

In addition, it is preferable that this heat treatment be performed in a specific atmospheric gas. The atmospheric gas used at this time has an important role in inhibiting blistering and in achieving excellent aesthetic appearance which is required for automotive outer panels.

The preferable atmospheric gas is a mixed gas having a hydrogen concentration of 3 vol. % or more and 15 vol. % or less, an oxygen concentration of 0.001 vol. % or more and 0.1 vol. % or less, and a CO concentration of 100 vol. ppm or more and 2000 vol. ppm or less with the balance being nitrogen and a dew point of −30° C. or lower and −60° C. or higher. The reasons why the use of such an atmospheric gas is preferable will be described hereafter.

In the case where the hydrogen concentration is less than 3 vol. %, since Fe or alloy chemical elements are oxidized when heating is performed, there is a decrease in the aesthetic surface appearance of a coating layer. On the other hand, in the case where the hydrogen concentration is more than 15 vol. %, since hydrogen penetration into a steel sheet becomes marked when heating is performed, there is an increase in the amount of blistering occurring after a galvanizing treatment has been performed.

In the case where the oxygen concentration is less than 0.001 vol. %, hydrogen penetration into a steel sheet becomes marked. On the other hand, in the case where the oxygen concentration is more than 0.1 vol. %, there is a decrease in the aesthetic surface appearance of a coating layer due to the oxidation of the surface of the steel sheet.

In the case where the CO concentration is less than 100 vol. ppm, since decarburization occurs in steel, it is not possible to achieve the desired material properties. On the other hand, in the case where the CO concentration is more than 2000 vol. ppm, there is a significant decrease in the aesthetic surface appearance of a coating layer due to the precipitation of graphite on the surface of a steel sheet.

In the case where the dew point is higher than −30° C., there is a decrease in the aesthetic surface appearance of a coating layer due to the oxidation of alloy chemical elements in Fe. On the other hand, in the case where the dew point is lower than −60° C., since hydrogen penetration into a steel sheet becomes marked, there is an increase in the amount of blistering occurring after a galvanizing treatment has been performed.

After heating and cooling have been performed, a galvanizing treatment is performed, and, at this time, it is preferable that the Al concentration in the galvanizing bath be 0.1% or more and 1% or less. After a galvanizing treatment has been performed, an alloying treatment may be performed.

Moreover, skin pass rolling may be performed with an elongation ratio of 1.2% or more and 2.0% or less. In the case where the elongation ratio is less than 1.2%, since yield point elongation occurs, there is a decrease in the surface quality after press forming has been performed. On the other hand, in the case where the elongation ratio is more than 2.0%, there is a significant decrease in elongation.

EXAMPLES

Example 1

Steel ingots having the chemical compositions given in Table 1 were dissolved and cast into slabs. These slabs were heated to a temperature of 1250° C. and then hot-rolled to have a thickness of 3.6 mm. The temperature of the steel sheet was 860° C. at the exit of the last pass of hot rolling. The hot-rolled steel sheets were cooled at an average cooling rate of 100° C./s to 250° C./sec. and then coiled at a coiling temperature of 300° C. to 350° C. Subsequently, cold rolling was performed in order to obtain a thickness of 1.2 mm, and, then, a heating treatment was performed. The heating treatment was performed in an atmospheric gas having a hydrogen concentration of 10 vol. %, an oxygen concentration of 0.01 vol. %, and a CO concentration of 500 vol. ppm with the balance being nitrogen and having a dew point of −50° C., to a temperature of 750° C. at an average heating rate of 100° C./sec. to 150° C./sec., and then the holding time was 300 seconds.

After this heating treatment was performed, cooling was performed to a temperature of 700° C. at an average cooling rate of 10° C./sec., and, subsequently, cooling was performed to a temperature of 500° C. at an average cooling rate of 15° C./sec. Subsequently, a galvanizing treatment was performed in a galvanizing bath having an Al concentration of 0.1% to 1%. After cooling had been performed to room temperature, skin pass rolling was performed with an elongation ratio of 1.4% to 1.6%.

The galvanized steel sheets manufactured as described above were evaluated by using the methods described below. An average ferrite grain diameter was determined by using a cutting method (JIS G 0552-1977) from an optical microscope image at a magnification of 100 times which was obtained from a sample prepared by performing mirror polishing on a cross section in the rolling direction of the steel sheet and by etching the polished cross section with a 3%-nital solution.

The surface area of the interface between ferrite and cementite was determined by using the sample described above, by identifying and separating a ferrite phase and a cementite phase by using a scanning electron microscope (SEM), and by then using a line segment method.

Hydrogen concentration in steel was determined by using the coated steel sheet in the coated state and by using an inert gas fusion-thermal conductivity method (hydrogen analysis machine: the RH-402 produced by LECO Corporation).

Tensile properties were determined by using a JIS No. 5 test piece (JIS Z 2201) which was taken in a direction at a right angle to the rolling direction in accordance with JIS Z 2241.

The amount of paint-bake hardening (BH) was determined in accordance with ANNEX of JIS G 3135.

Regarding blistering, the number of spots having a diameter of 0.1 mm or more where the coating layer became swollen per 1 m² of the surface area of the steel sheet was counted by performing a visual test and observation using a loupe at a magnification of 10 times.

Corrosion resistance was evaluated by using the following method. A chemical conversion treatment was performed in chemical conversion treatment solution PB-SX35T produced by Nihon Parkerizing Co., Ltd., and then painting was performed by using cationic electrodeposition paint POWERNICS 110 produced by Nippon Paint Co., Ltd. in order to form a paint film having a thickness of about 20 μm. Subsequently, the paint film was subjected to cross cut by using a cutter in order to determine a swelling width (one-side maximum swelling width) from the cross cut after having performed 180 cycles (60 days) of a combined corrosion test prescribed by the Society of Automotive Engineers of Japan (JASO-M609). Among the results, a case where the swelling width was 5 mm or less was judged as good, and a case where the swelling width was more than 5 mm was judged as x.

Press formability was evaluated by performing drawing with a blank holding force of 20 tons and a forming height of 60 mm by using a hog-backed punch of 500 mm square and by evaluating whether or not a crack occurred and whether or not surface quality of a pressed product was good by performing a visual test.

The evaluation results are given in Table 2 (Table 2-1 and Table 2-2 are combined to form Table 2). From these results, it is clarified that the steel sheets manufactured in accordance with the method of the present invention were excellent in terms of all of tensile properties, the amount of paint-bake hardening, blister resistance, and press formability. On the other hand, the steel sheets out of the range of the present invention were poor in terms of one of the properties. For example, in the case of steel sheets 1 and 2, which had a low C content, since the interface between ferrite and cementite was not sufficiently formed, blistering occurred. In the case of steel sheet 9, which had a high C content, an excessive amount of cementite was formed, and there was a decrease in press formability due to a decrease in elongation. In the case of steel 10, which had a high Mn content, there was a decrease in elongation, and there was a decrease in press formability. In the case of steels 11 and 12, which had a high Si content or a high P content, there was a decrease in elongation, and there was a decrease in press formability and a coating defect occurred. In the case of steel 14, which had a high B content, yield point elongation occurred, and stretcher strain occurred in the press formability test.

Example 2

By using steels given in Table 1, galvanized steel sheets having a thickness of 1.2 mm were manufactured under the manufacturing conditions given in Table 3. The galvanized steel sheets manufactured in such a manner were evaluated by using the same methods as those used in the EXAMPLE 1. The evaluation results are given in Table 4 (Table 4-1 and Table 4-2 are combined to form Table 4). From these results, it is clarified that the steel sheets manufactured by using preferable methods were excellent in terms of all of tensile properties, the amount of paint-bake hardening, blister resistance, and press formability. On the other hand, as Table 3 and Table 4 indicate, it can be said that the steel sheets out of the preferable range were poor in terms of one of the properties. For example, in the case of steel sheet A, which had a steel chemical composition out of the range according to the present invention, the interface between ferrite and cementite was not sufficiently formed, and blistering occurred. In the case of steel sheet B, which was cooled at a low cooling rate after hot rolling had been performed, the interface between ferrite and cementite was not sufficiently formed, and blistering occurred. In the case of steel sheet C, which was coiled at a high coiling temperature, the interface between ferrite and cementite was not sufficiently formed, and blistering occurred. In the case of steel sheet F, which was subjected to the heating treatment in the atmospheric gas having a high hydrogen concentration, the hydrogen concentration in the galvanized steel sheet was high, and blistering occurred. In the case of steel sheet G, which was subjected to the heating treatment in the atmospheric gas having a low oxygen concentration, the hydrogen concentration in the galvanized steel sheet was high, and blistering occurred. In the case of steel sheet I, which was subjected to the heating treatment in the atmospheric gas having a low dew point, the hydrogen concentration in the galvanized steel sheet was high, and blistering occurred. In the case of steel sheet J, which was subjected to the heating treatment at a low temperature, since ferrite grain diameter was small, there was a decrease in press formability due to a decrease in elongation. In the case of steel sheet K, which was subjected to the heating treatment at a high temperature, since the hydrogen concentration in the galvanized steel sheet was high, blistering occurred. In addition, since ferrite grain diameter was large, a rough surface defect occurred in the press formability test. In the case of steel sheet O, which had a large coating weight of a galvanizing layer, blistering occurred. In addition, a crack occurred in the press formability test. In the case of steel sheet P, which had a small coating weight of a galvanizing layer, there was insufficient corrosion resistance.

TABLE 1

| Steel No. | Chemical Composition (mass %) | | | | | | | | | Class |
|---|---|---|---|---|---|---|---|---|---|---|
| | C | Si | Mn | P | S | Sol. Al | N | B | Others | |
| 1 | 0.002 | 0.04 | 0.17 | 0.034 | 0.006 | 0.034 | 0.004 | | 0.04Ti | Comparative Example |
| 2 | 0.010 | 0.04 | 0.11 | 0.024 | 0.006 | 0.074 | 0.004 | | | Comparative Example |
| 3 | 0.091 | 0.13 | 0.17 | 0.019 | 0.008 | 0.011 | 0.005 | | | Example |
| 4 | 0.027 | 0.01 | 0.68 | 0.021 | 0.005 | 0.047 | 0.002 | | | Example |
| 5 | 0.029 | 0.01 | 0.32 | 0.063 | 0.008 | 0.089 | 0.005 | | | Example |
| 6 | 0.040 | 0.01 | 0.31 | 0.013 | 0.007 | 0.021 | 0.003 | | | Example |
| 7 | 0.018 | 0.27 | 0.47 | 0.013 | 0.007 | 0.020 | 0.003 | | | Example |
| 8 | 0.077 | 0.01 | 0.20 | 0.012 | 0.010 | 0.091 | 0.002 | | | Example |
| 9 | 0.130 | 0.10 | 0.70 | 0.018 | 0.006 | 0.083 | 0.003 | | | Comparative Example |
| 10 | 0.073 | 0.02 | 1.20 | 0.039 | 0.003 | 0.028 | 0.004 | | | Comparative Example |
| 11 | 0.038 | 0.40 | 0.62 | 0.022 | 0.004 | 0.049 | 0.005 | | | Comparative Example |

TABLE 1-continued

| Steel No. | Chemical Composition (mass %) | | | | | | | | | Class |
|---|---|---|---|---|---|---|---|---|---|---|
| | C | Si | Mn | P | S | Sol. Al | N | B | Others | |
| 12 | 0.082 | 0.02 | 0.27 | <u>0.080</u> | 0.010 | 0.065 | 0.002 | | | Comparative Example |
| 13 | 0.073 | 0.14 | 0.65 | 0.020 | 0.007 | 0.087 | 0.004 | 0.0015 | | Example |
| 14 | 0.017 | 0.06 | 0.25 | 0.014 | 0.007 | 0.070 | 0.004 | <u>0.0100</u> | | Comparative Example |
| 15 | 0.025 | 0.02 | 0.38 | 0.033 | 0.003 | 0.090 | 0.003 | | 0.1Cr | Example |
| 16 | 0.052 | 0.13 | 0.89 | 0.017 | 0.008 | 0.031 | 0.002 | | 0.02Ti | Example |
| 17 | 0.085 | 0.19 | 0.21 | 0.024 | 0.003 | 0.040 | 0.002 | | 0.015Nb | Example |
| 18 | 0.085 | 0.04 | 0.77 | 0.010 | 0.004 | 0.069 | 0.004 | | 0.02Cu | Example |
| 19 | 0.025 | 0.05 | 0.19 | 0.013 | 0.005 | 0.032 | 0.005 | | 0.02Ni | Example |
| 20 | 0.045 | 0.06 | 0.30 | 0.018 | 0.009 | 0.081 | 0.005 | | 0.005V | Example |
| 21 | 0.029 | 0.01 | 0.32 | 0.063 | 0.007 | 0.090 | 0.004 | | 0.008Zr | Example |

An underlined portion: indicates a value out of the range according to the present invention.

TABLE 2

Table 2-1

| Steel Sheet | Steel No. | Microstructure | Ferrite Grain Diameter (µm) | Surface Area of Interface between Ferrite and Cementite (/mm) | Hydrogen Concentration in Steel (ppm) | Galvanizing Layer | | | Class |
|---|---|---|---|---|---|---|---|---|---|
| | | | | | | Coating Weight (g/m$^2$) | Alloying | Fe Concentration (%) | |
| 1 | <u>1</u> | Ferrite | 19.7 | <u>0</u> | <0.1 | 80 | — | — | Comparative Example |
| 2 | <u>2</u> | Ferrite + Cementite | 18.2 | <u>0.5</u> | <0.1 | 80 | — | — | Comparative Example |
| 3 | 3 | Ferrite + Cementite | 10.5 | 9.1 | <0.1 | 80 | — | — | Example |
| 4 | 4 | Ferrite + Cementite | 15.7 | 2.3 | <0.1 | 80 | — | — | Example |
| 5 | 5 | Ferrite + Cementite | 15.5 | 2.5 | <0.1 | 45 | — | — | Example |
| 6 | 6 | Ferrite + Cementite | 14.3 | 3.6 | <0.1 | 45 | Done | 10 | Example |
| 7 | 7 | Ferrite + Cementite | 17.0 | 1.3 | <0.1 | 80 | Done | 10 | Example |
| 8 | 8 | Ferrite + Cementite | 11.3 | 7.5 | <0.1 | 100 | — | — | Example |
| 9 | <u>9</u> | Ferrite + Cementite | 8.7 | <u>13.2</u> | <0.1 | 80 | — | — | Comparative Example |
| 10 | <u>10</u> | Ferrite + Cementite | 11.5 | 7.2 | <0.1 | 80 | — | — | Comparative Example |
| 11 | <u>11</u> | Ferrite + Cementite | 14.4 | 3.5 | <0.1 | 80 | — | — | Comparative Example |
| 12 | <u>12</u> | Ferrite + Cementite | 11.0 | 8.1 | <0.1 | 80 | — | — | Comparative Example |
| 13 | 13 | Ferrite + Cementite | 11.6 | 7.1 | <0.1 | 80 | — | — | Example |
| 14 | <u>14</u> | Ferrite + Cementite | 17.1 | 1.2 | <0.1 | 80 | — | — | Comparative Example |
| 15 | 15 | Ferrite + Cementite | 16.0 | 2.0 | <0.1 | 80 | — | — | Example |
| 16 | 16 | Ferrite + Cementite | 13.2 | 4.9 | <0.1 | 80 | — | — | Example |
| 17 | 17 | Ferrite + Cementite | 10.8 | 8.4 | <0.1 | 45 | — | — | Example |
| 18 | 18 | Ferrite + Cementite | 10.8 | 8.4 | <0.1 | 45 | Done | 10 | Example |
| 19 | 19 | Ferrite + Cementite | 16.0 | 2.0 | <0.1 | 80 | — | — | Example |
| 20 | 20 | Ferrite + Cementite | 15.5 | 2.5 | <0.1 | 80 | Done | 10.00 | Example |
| 21 | 21 | Ferrite + Cementite | 15.5 | 2.5 | <0.1 | 60 | — | — | Example |

An underlined portion: indicates a metallographic structure out of the range according to the present invention.

Table 2-2

| Steel Sheet | Steel No. | Tensile Property | | | | BH (MPa) | Surface Quality | Blister (Piece/m$^2$) | Press Formability | Corrosion Resistance | Class |
|---|---|---|---|---|---|---|---|---|---|---|---|
| | | Yield Strength (MPa) | Yield Elongation (%) | Tensile Strength (MPa) | Elongation (%) | | | | | | |
| 1 | <u>1</u> | 204 | 0.0 | 300 | 50 | 58 | <u>Blister</u> | <u>5</u> | good | good | Comparative Example |
| 2 | <u>2</u> | 201 | 0.1 | 295 | 51 | 66 | <u>Blister</u> | 2 | good | good | Comparative Example |
| 3 | 3 | 248 | 0.1 | 365 | 41 | 53 | good | 0 | good | good | Example |
| 4 | 4 | 224 | 0.2 | 329 | 46 | 49 | good | 0 | good | good | Example |
| 5 | 5 | 241 | 0.0 | 355 | 42 | 53 | good | 0 | good | good | Example |
| 6 | 6 | 213 | 0.1 | 314 | 48 | 46 | good | 0 | good | good | Example |

TABLE 2-continued

| | | | | | | | | | | | | |
|---|---|---|---|---|---|---|---|---|---|---|---|---|
| 7 | 7 | 228 | 0.1 | 336 | 45 | 47 | good | 0 | good | | good | Example |
| 8 | 8 | 227 | 0.1 | 334 | 45 | 60 | good | 0 | good | | good | Example |
| 9 | 9 | 278 | 0.0 | 409 | 37 | 47 | good | 0 | Crack | | good | Comparative Example |
| 10 | 10 | 277 | 0.0 | 407 | 37 | 44 | good | 0 | Crack | | good | Comparative Example |
| 11 | 11 | 261 | 0.2 | 385 | 39 | 69 | Coating Defect | 0 | Crack | | good | Comparative Example |
| 12 | 12 | 276 | 0.0 | 406 | 37 | 41 | Coating Defect | 0 | Crack | | good | Comparative Example |
| 13 | 13 | 256 | 0.1 | 377 | 40 | 52 | good | 0 | good | | good | Example |
| 14 | 14 | 203 | 0.8 | 299 | 50 | 100 | good | 0 | Stretcher Strain | | good | Comparative Example |
| 15 | 15 | 222 | 0.2 | 326 | 46 | 44 | good | 0 | good | | good | Example |
| 16 | 16 | 251 | 0.0 | 369 | 41 | 48 | good | 0 | good | | good | Example |
| 17 | 17 | 254 | 0.1 | 373 | 40 | 60 | good | 0 | good | | good | Example |
| 18 | 18 | 251 | 0.0 | 369 | 41 | 54 | good | 0 | good | | good | Example |
| 19 | 19 | 205 | 0.1 | 302 | 50 | 58 | good | 0 | good | | good | Example |
| 20 | 20 | 241 | 0.1 | 354 | 42 | 66 | good | 0 | good | | good | Example |
| 21 | 21 | 255 | 0.0 | 365 | 41 | 55 | good | 0 | good | | good | Example |

An underlined portion: indicates an unsatisfactory property.

TABLE 3

| | | Hot Rolling Temperature Condition | | | | Heat Treatment Atmospheric Gas | | | |
|---|---|---|---|---|---|---|---|---|---|
| Steel Sheet | Steel No. | Heating Temperature (° C.) | Finishing Temperature (° C.) | Cooling Rate (° C./sec.) | Coiling Temperature (° C.) | Hydrogen Concentration (%) | Oxygen Concentration (%) | CO Concentration (ppm) | Dew Point (° C.) |
| A | 2 | 1290 | 850 | 110 | 250 | 13 | 0.084 | 1090 | −50 |
| B | 3 | direct rolling | 860 | 40 | 250 | 7 | 0.044 | 1160 | −48 |
| C | 4 | 1210 | 870 | 120 | 720 | 10 | 0.002 | 850 | −37 |
| D | 5 | 1230 | 830 | 110 | 480 | 12 | 0.035 | 250 | −47 |
| E | 6 | 1220 | 870 | 100 | 340 | 6 | 0.083 | 1160 | −36 |
| F | 7 | 1230 | 830 | 120 | 230 | 20 | 0.061 | 360 | −42 |
| G | 8 | 1230 | 850 | 180 | 330 | 13 | 0.000 | 1010 | −30 |
| H | 13 | 1220 | 830 | 170 | 280 | 8 | 0.073 | 500 | −57 |
| I | 15 | 1240 | 840 | 160 | 310 | 4 | 0.002 | 430 | −61 |
| J | 16 | 1280 | 870 | 100 | 290 | 7 | 0.046 | 1380 | −53 |
| K | 17 | 1240 | 850 | 190 | 240 | 12 | 0.018 | 510 | −58 |
| L | 18 | 1290 | 850 | 110 | 270 | 10 | 0.023 | 280 | −58 |
| M | 19 | 1240 | 840 | 120 | 280 | 11 | 0.006 | 660 | −41 |
| N | 20 | 1240 | 830 | 150 | 320 | 11 | 0.001 | 990 | −40 |
| O | 5 | 1230 | 830 | 110 | 480 | 12 | 0.035 | 250 | −47 |
| P | 6 | 1220 | 870 | 100 | 340 | 6 | 0.083 | 1160 | −36 |

| | Heat Treatment Temperature Condition | | | | | |
|---|---|---|---|---|---|---|
| Steel Sheet | Heating Rate (° C./sec.) | Soaking Temperature (° C.) | Soaking Time (sec.) | Cooling Rate (° C./sec.) | Skin Pass Rolling Elongation Ratio (%) | Class |
| A | 120 | 850 | 210 | 23 | 1.4 | Comparative Example |
| B | 150 | 810 | 50 | 17 | 1.8 | Comparative Example |
| C | 170 | 830 | 90 | 13 | 1.3 | Comparative Example |
| D | 100 | 820 | 50 | 20 | 1.9 | Example |
| E | 110 | 820 | 280 | 21 | 1.7 | Example |
| F | 120 | 820 | 90 | 12 | 1.8 | Comparative Example |
| G | 110 | 830 | 40 | 28 | 1.4 | Comparative Example |
| H | 140 | 860 | 230 | 22 | 1.6 | Example |
| I | 170 | 810 | 170 | 16 | 1.5 | Comparative Example |
| J | 100 | 680 | 80 | 18 | 1.4 | Comparative Example |
| K | 130 | 880 | 240 | 11 | 1.4 | Comparative Example |
| L | 160 | 820 | 130 | 27 | 1.8 | Example |
| M | 160 | 830 | 160 | 27 | 1.5 | Example |
| N | 140 | 800 | 130 | 29 | 1.9 | Example |
| O | 100 | 820 | 50 | 20 | 1.9 | Comparative Example |
| P | 110 | 820 | 280 | 21 | 1.7 | Comparative Example |

TABLE 4

Table 4-1

| Steel Sheet | Steel No. | Microstructure | Ferrite Grain Diameter (μm) | Surface Area of Interface between Ferrite and Cementite (/mm) | Hydrogen Concentration in Steel (ppm) | Galvanizing Layer Coating Weight (g/m$^2$) | Alloying | Fe Concentration (%) | Class |
|---|---|---|---|---|---|---|---|---|---|
| A | 2 | Ferrite + Cementite | 18.2 | 0.7 | <0.1 | 80 | — | — | Comparative Example |
| B | 3 | Ferrite + Cementite | 10.5 | 0.8 | <0.1 | 80 | — | — | Comparative Example |
| C | 4 | Ferrite + Cementite | 15.7 | 0.2 | <0.1 | 80 | — | — | Comparative Example |
| D | 5 | Ferrite + Cementite | 15.5 | 1.1 | <0.1 | 45 | — | — | Example |
| E | 6 | Ferrite + Cementite | 14.3 | 3.6 | <0.1 | 45 | Done | 10 | Example |
| F | 7 | Ferrite + Cementite | 17.0 | 1.3 | 0.3 | 80 | — | — | Comparative Example |
| G | 8 | Ferrite + Cementite | 11.3 | 7.5 | 0.2 | 100 | — | — | Comparative Example |
| H | 13 | Ferrite + Cementite | 11.6 | 7.1 | <0.1 | 80 | — | — | Example |
| I | 15 | Ferrite + Cementite | 16.0 | 2.0 | 0.2 | 80 | — | — | Comparative Example |
| J | 16 | Ferrite + Cementite | 8.9 | 4.9 | <0.1 | 80 | — | — | Comparative Example |
| K | 17 | Ferrite + Cementite | 31.0 | 8.4 | 0.3 | 45 | Done | 10 | Comparative Example |
| L | 18 | Ferrite + Cementite | 10.8 | 8.4 | <0.1 | 45 | — | — | Example |
| M | 19 | Ferrite + Cementite | 16.0 | 2.0 | <0.1 | 80 | — | — | Example |
| N | 20 | Ferrite + Cementite | 15.5 | 2.5 | <0.1 | 80 | — | — | Example |
| O | 5 | Ferrite + Cementite | 15.5 | 1.1 | <0.1 | 130 | — | — | Comparative Example |
| P | 6 | Ferrite + Cementite | 14.3 | 3.6 | <0.1 | 30 | Done | 12 | Comparative Example |

An underlined portion: indicates, for example, a steel chemical composition or a metallographic structure out of the range according to the present invention.

Table 4-2

| Steel Sheet | Steel No. | Tensile Property Yield Strength (MPa) | Yield Elongation (%) | Tensile Strength (MPa) | Elongation (%) | BH (MPa) | Surface Quality | Blister (Piece/m$^2$) | Press Formability | Corrosion Resistance | Class |
|---|---|---|---|---|---|---|---|---|---|---|---|
| A | 2 | 190 | 0.0 | 286 | 52 | 80 | Blister | 3 | good | good | Comparative Example |
| B | 3 | 256 | 0.1 | 377 | 42 | 47 | Blister | 2 | good | good | Comparative Example |
| C | 4 | 214 | 0.2 | 315 | 48 | 44 | Blister | 5 | good | good | Comparative Example |
| D | 5 | 248 | 0.0 | 365 | 41 | 47 | good | 0 | good | good | Example |
| E | 6 | 215 | 0.1 | 317 | 47 | 85 | good | 0 | good | good | Example |
| F | 7 | 227 | 0.1 | 334 | 45 | 46 | Blister | 3 | good | good | Comparative Example |
| G | 8 | 236 | 0.1 | 347 | 43 | 80 | Blister | 2 | good | good | Comparative Example |
| H | 13 | 263 | 0.1 | 387 | 41 | 72 | good | 0 | good | good | Example |
| I | 15 | 241 | 0.2 | 355 | 42 | 95 | Blister | 2 | good | good | Comparative Example |
| J | 16 | 268 | 0.0 | 462 | 38 | 80 | good | 0 | Crack | good | Comparative Example |
| K | 17 | 277 | 0.1 | 408 | 40 | 61 | Blister | 3 | Rough Surface | good | Comparative Example |
| L | 18 | 273 | 0.0 | 401 | 40 | 93 | good | 0 | good | good | Example |
| M | 19 | 211 | 0.1 | 310 | 48 | 47 | good | 0 | good | good | Example |
| N | 20 | 234 | 0.1 | 344 | 44 | 77 | good | 0 | good | good | Example |
| O | 5 | 248 | 0.0 | 365 | 41 | 47 | Blister | 5 | Crack | good | Comparative Example |
| P | 6 | 215 | 0.1 | 317 | 47 | 85 | good | 0 | good | x | Comparative Example |

An underlined portion: indicates an unsatisfactory property.

The invention claimed is:

1. A bake-hardening galvanized steel sheet having a base steel sheet and a coating layer formed on the base steel sheet, the base steel sheet comprising, by mass %:
   C: 0.015% or more and 0.100% or less;
   Si: 0.01% or more and 0.30% or less;
   Mn: 0.1% or more and 1.0% or less;
   P: 0.010% or more and 0.070% or less;
   S: 0.003% or more and 0.020% or less;
   Sol.Al: 0.01% or more and 0.10% or less;
   N: 0.002% or more and 0.005% or less; and
   the balance being Fe and inevitable impurities,
   wherein a metallographic structure of the base steel sheet includes a ferrite phase, a cementite phase, and low-temperature-transformation phases, the low-temperature-transformation phases being present in the metallographic structure in an amount of 5 vol. % or less, an average ferrite grain diameter being in a range of 10 μm or more and 30 μm or less and an average surface area of an interface between ferrite and cementite per unit volume being in a range of 1.0/mm or more and 10.0/mm or less,
   a hydrogen element concentration in steel of the base steel sheet, which is measured in terms of hydrogen gas amount, is less than 0.1 ppm, and
   the coating layer has a zinc coating weight per unit surface area of the steel sheet in a range of 40 $g/m^2$ or more and 100 $g/m^2$ or less.

2. The bake-hardening galvanized steel sheet according to claim 1, wherein the base steel sheet further comprises, by mass %, B: 0.0010% or more and 0.0050% or less.

3. The bake-hardening galvanized steel sheet according to claim 2, wherein the base steel sheet further comprises, by mass %, at least one selected from the group consisting of Ti: 0.001% or more and 0.1% or less, Nb: 0.001% or more and 0.1% or less, Zr: 0.001% or more and 0.1% or less, Cr: 0.001% or more and 0.1% or less, Cu: 0.001% or more and 0.1% or less, Ni: 0.001% or more and 0.1% or less, and V: 0.001% or more and 0.1% or less.

4. The bake-hardening galvanized steel sheet according to claim 1, wherein the base steel sheet further comprises, by mass %, at least one selected from the group consisting of Ti: 0.001% or more and 0.1% or less, Nb: 0.001% or more and 0.1% or less, Zr: 0.001% or more and 0.1% or less, Cr: 0.001% or more and 0.1% or less, Cu: 0.001% or more and 0.1% or less, Ni: 0.001% or more and 0.1% or less, and V: 0.001% or more and 0.1% or less.

* * * * *